Sept. 21, 1954　　　H. R. SIMONDS　　　2,689,908
HEADLIGHT
Filed Dec. 12, 1950
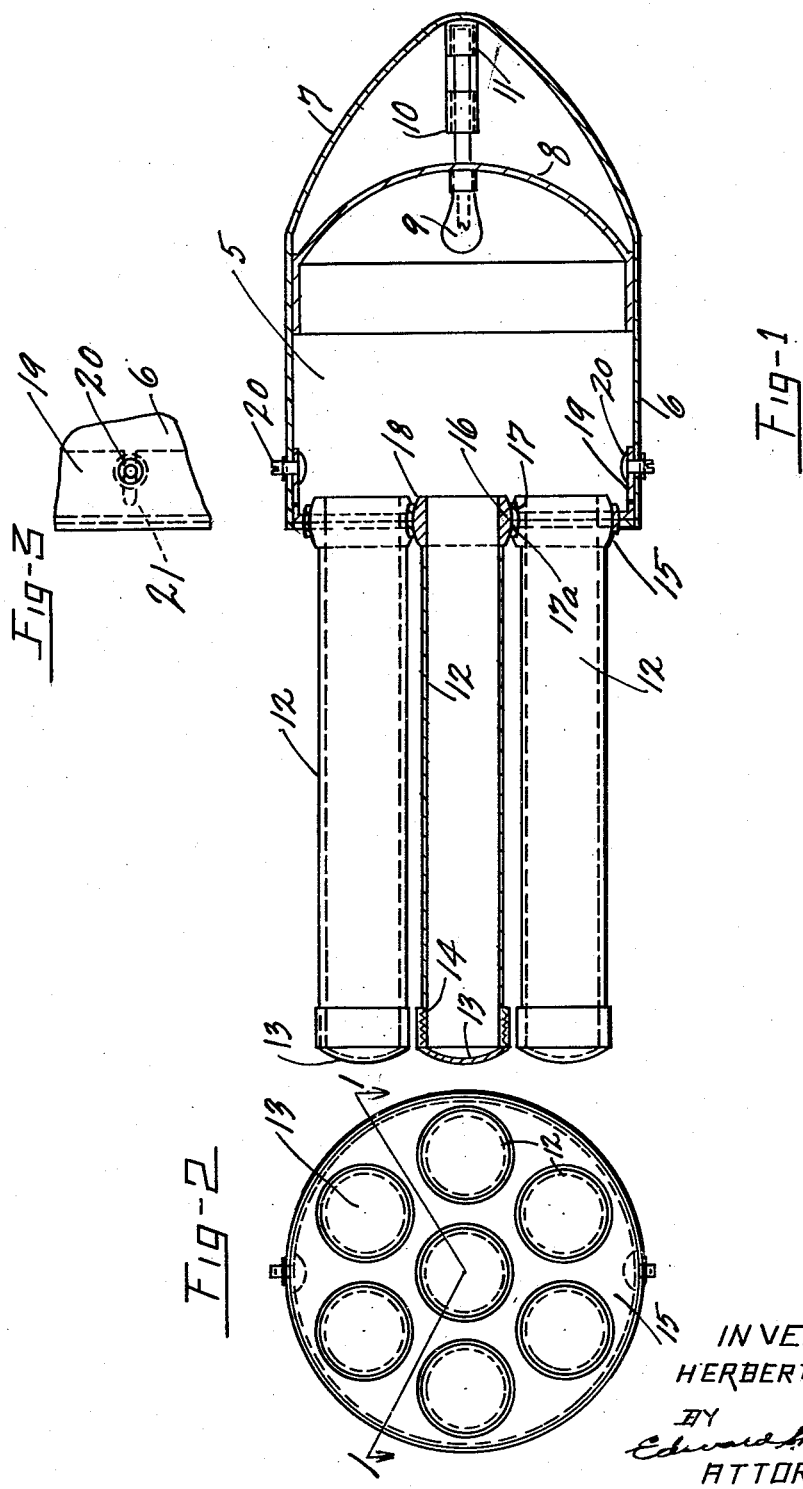
INVENTOR
HERBERT R SIMONDS
BY
Edward Reed
ATTORNEY

UNITED STATES PATENT OFFICE 2,689,908

HEADLIGHT

Herbert R. Simonds, Dayton, Ohio

Application December 12, 1950, Serial No. 200,392

1 Claim. (Cl. 240—41.35)

This invention relates to a headlight and is designed primarily for use on automobiles, but is not limited to such use.

The main object of the invention is to provide a headlight which will adequately illuminate the road in advance of an automobile but will not interfere with the vision of the driver of an approaching automobile.

A further object of the invention is to provide a headlight in which the rays of light from a reflector are grouped in a plurality of beams which are separately projected from the headlight and in which the light of each projected beam may be individually diffused.

A further object of the invention is to provide such a headlight in which the several beams may be adjusted with relation one to the other.

A further object of the invention is to provide a headlight in which a plurality of tubes are substituted for the usual lens and each tube is provided with a separate lens.

Other objects of the invention may appear as the headlight is described in detail.

In the accompanying drawing Fig. 1 is a longitudinal sectional view through a headlight embodying the invention on line 1—1 on Fig. 2; Fig. 2 is a front end elevation of the same; and Fig. 3 is a detail view showing the adjustable connection between the tube supporting member and the casing of the headlight.

In these drawings I have illustrated one embodiment of the invention and have shown the headlight as comprising a casing 5 having a cylindrical portion 6 and a tapered and closed rear portion 7. A reflector 8 is mounted within the cylindrical portion of the casing and extends into the tapered rear portion thereof. An electric lamp 9 is supported in the casing in front of the lens 8 and substantially at the center of the latter. This lamp may be supported in any suitable manner and in the present instance it is carried by a supporting member 10 a part of which extends through the reflector and carries the lamp and the rear portion of which is mounted in a socket 11 in the small rear end portion of the casing. The headlight may be mounted on an automobile, or other vehicle, in the usual, or any suitable manner. Likewise, the lamp may be connected with any suitable source of current in any suitable manner.

Supported at the front end of the casing and in line with the reflector 8 are a plurality of tubes 12 and the relative positions of the reflector and the tubes are such that the rays of light are reflected by the reflector into the tubes and are thus grouped or segregated in the form of beams of light which are separately projected in advance of the vehicle. Each of the tubes may be, and preferably is, provided with an individual diffusing lens 13 and this lens is adjustably mounted on the end of the tube to enable the diffusion of the beam of light to be regulated, as by mounting the lens on a cap 14 which is screw threaded onto the end portion of the tube.

There may be any suitable number of tubes arranged in any suitable relation one to the other and these tubes may be mounted on the headlight casing in any suitable manner. In the preferred arrangement the front wall 15 of the casing is provided with a plurality of openings 16 adapted to receive the respective tubes. As here shown the end wall is provided with a circular series of openings, in the present instance six, and with a central opening arranged with the series of circular openings. The tubes may be supported on the end wall in line with the respective openings therein in various ways but it is desirable that the tubes shall be transversely adjustable with relation one to the other, as by mounting them on the end wall of the casing for movement about transverse axes. For this purpose each of the openings 16 is provided with a bearing 17 which extends about the opening and conforms in contour to a section of a sphere, and the inner end of each tube is provided with a spherical enlargement 18 which fits snugly in the corresponding spherical bearing. Each bearing is preferably formed in two parts, as shown at 17 and 17a, to facilitate the assembly of the tube. The enlarged end portions of the tube fit snugly in the bearings with sufficient friction to prevent the movement thereof under normal operating conditions but to permit a slight movement of the tubes about the axes of the bearings to adjust the forward ends of the tubes with relation one to the other. The tubes are also adjustable lengthwise toward and from the reflector 8, this being accomplished in the present instance by providing the end wall 15 with a circumferential flange 19 which extends into the forward end of the casing and is adjustably connected therewith by bolts 20 which extend through slots 21 in the flange 19 and secure that flange firmly to the cylindrical wall of the casing in longitudinally adjusted positions with relation thereto.

Thus it will be apparent that I have substituted for the single, and usually intense beam, of light of an ordinary headlight a plurality of smaller beams which are projected in adjacent paths and each of which is individually diffused so that none of the individual beams, or the group of beams, produces an objectionable light or glare in the eyes of a driver of an approaching automobile.

While I have shown and described one embodiment of my invention, I wish it to be understood that I do not desire to be limited to the details thereof, as various modifications may occur to a person skilled in the art.

Now having fully shown and described my invention, what I claim as new and desire to secure by Letters Patent, is:

A headlight comprising a casing having a rear end wall and a front end wall, said front end wall being adjustably positioned with respect to said rear wall and having a plurality of openings therethrough, a plurality of tubes supported on said casing in line with and extending forwardly from the respective openings in said front wall, means for connecting said tubes with said casing for relative adjustment of said tubes one with respect to another about transverse axes substantially in the plane of said front wall, a diffusing lens adjustably positioned at the end of each of said tubes, a source of light adjustably supported in said casing adjacent said rear wall, and a reflector supported in said casing in the rear of said light source to reflect light from said light source through said tubes.

References Cited in the file of this patent

UNITED STATES PATENTS

| Number | Name | Date |
|---|---|---|
| 1,160,718 | Ingalls | Nov. 16, 1915 |
| 1,194,135 | Brown | Aug. 8, 1916 |
| 1,615,067 | Boerman | Jan. 18, 1927 |
| 1,844,624 | Young et al. | Feb. 9, 1932 |
| 1,915,193 | Maly | June 20, 1933 |
| 2,117,099 | Maly | May 10, 1938 |
| 2,238,409 | Bomberger | Apr. 15, 1941 |

FOREIGN PATENTS

| Number | Country | Date |
|---|---|---|
| 666,308 | France | May 18, 1929 |